Dec. 17, 1929.  A. W. CAPS  1,739,886
REPRODUCING OR ENLARGING CAMERA
Filed May 18, 1923
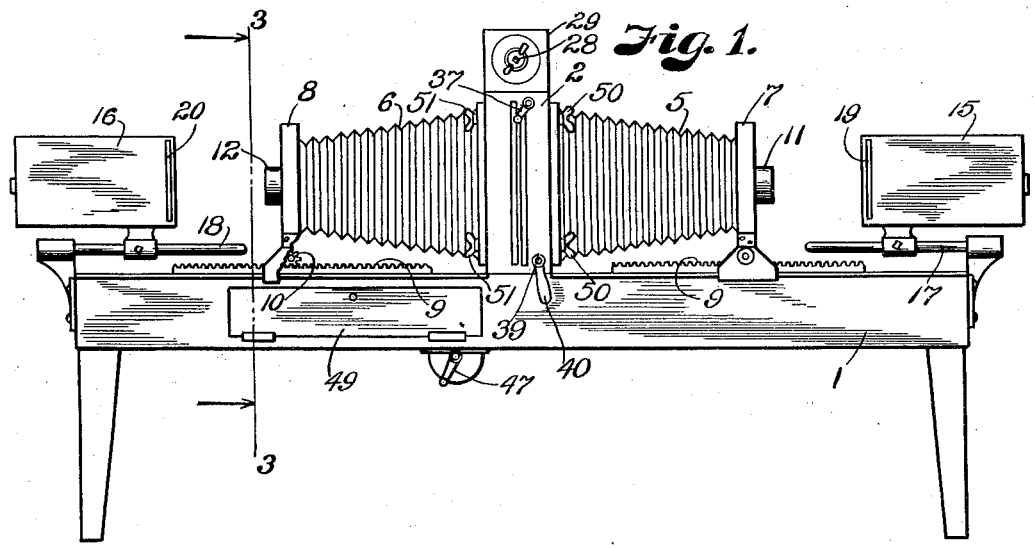
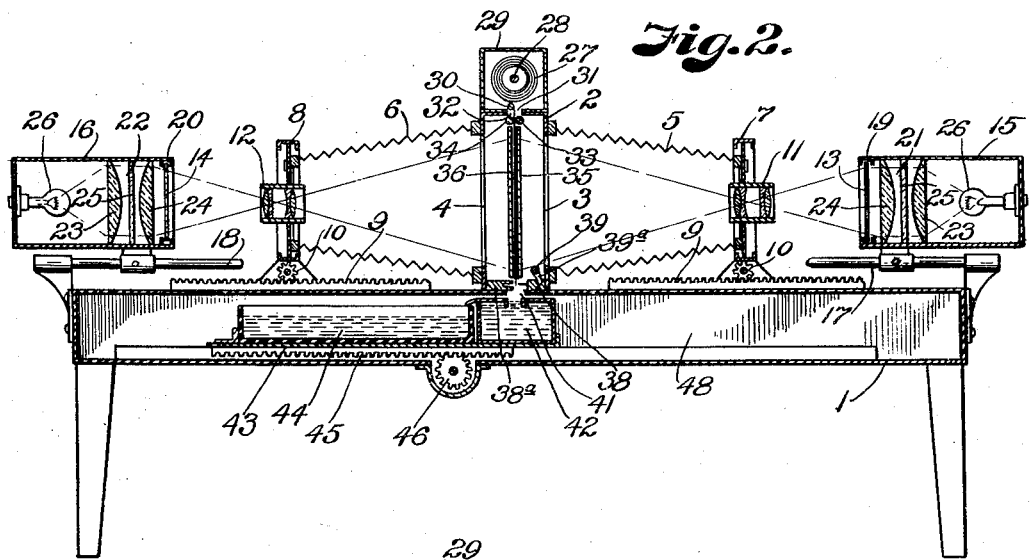
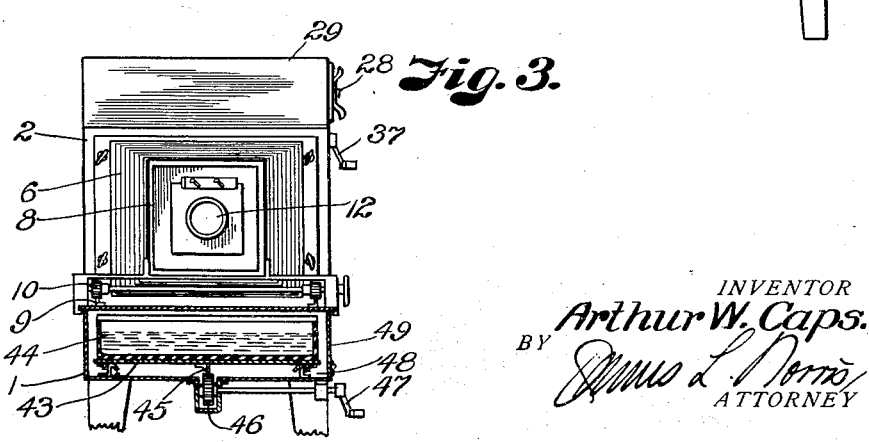
INVENTOR
Arthur W. Caps.
BY
ATTORNEY Patented Dec. 17, 1929

1,739,886

UNITED STATES PATENT OFFICE

ARTHUR W. CAPS, OF KANSAS CITY, MISSOURI, ASSIGNOR, BY MESNE ASSIGNMENTS, TO PHOTOSTAT CORPORATION, OF PROVIDENCE, RHODE ISLAND, A CORPORATION OF RHODE ISLAND

REPRODUCING OR ENLARGING CAMERA

Application filed May 18, 1923. Serial No. 639,872.

The present invention relates to improvements in photographic cameras of apparatus of the class used for the making of photographic prints upon photographic paper or other suitable sensitized material, an example of a machine of this same general class being shown and described in Letters Patent No. 929,757, granted August 3, 1909. The invention relates more particularly to photographic apparatus of this class adapted for the production of photographic enlargements from negatives, and more especially for the production of photographic enlargements on the opposite sides of paper or other photographic material which is sensitized on both of its surfaces.

One of the primary objects of the present invention is to provide a novel and improved machine of this class capable of rapidly and efficiently making photographic enlargements of small negatives on the respective sides of photographic material sensitized on both sides. Another object of the invention is to provide novel and improved means for individually focusing small negatives and also lenses associated therewith relatively to the respective sides of photographic material sensitized on both sides, whereby negatives of the same size or of different sizes may be reproduced or enlarged so as to make the images on the photographic paper of the same size or of different sizes, as may be desired; and, moreover, any desired number of enlargements may be successively made on the photographic paper from the same or different negatives, without requiring refocusing of the negatives or the lenses pertaining thereto.

Further objects of the invention are to provide means for passing a sheet of sensitized paper or material, sensitized on both sides, between two lenses which have been previously focused with respect to two small negatives, so that one or more reproductions or enlargements may be made successively without refocusing the machine; to provide novel and improved means for illuminating the negatives for enlargement whereby uniform illumination throughout their areas and, in consequence, uniformly exposed reproductions or enlargements from such negatives may be obtained, and to provide relatively simple and efficient means for developing and fixing the exposed portions of the photograpic paper or material and for cutting off the same to the proper or desired lengths.

To these and other ends, the invention consists in certain improvements and combinations and arrangements of parts, all as will be hereinafter more fully described, the features of novelty being pointed out particularly in the claims at the end of the specification.

In the accompanying drawing:—

Figure 1 is a side elevation of a photographic enlarging machine constructed in accordance with the present invention;

Figure 2 represents a vertical section taken longitudinally through the machine shown in Figure 1; and Figure 3 represents a transverse section through the machine on the line 3—3 of Figure 1.

Similar parts are designated by the same reference characters in the several views.

The present invention provides a duplex machine by which photographic enlargements or reproductions may be made at each operation on the opposite surfaces of photographic paper or material which is sensitized on both sides, it embodying the structural features and possessing the advantages to be hereinafter set forth. The preferred embodiment of the invention is shown in the accompanying drawings and will be described in detail, but it is to be understood that the invention is not restricted to the precise construction shown, as equivalent constructions are contemplated and these will be included within the scope of the claims.

In the present instance, the machine comprises a suitable table 1 which preferably supports the various parts of the machine. This table, which may be composed of any suitable material, preferably sheet metal, provides a support on which the casing 2 is fixed, this casing having openings 3 and 4 in its opposite sides and having bellows 5 and 6 suitably attached to its opposite sides, so as to surround the openings 3 and 4 respectively, these bellows extending respectively to a pair of frames 7 and 8 constituting camera fronts which are located at opposite sides of the casing 2. The fronts 7 and 8 are adjustable in a direction toward and from the casing 2, it being preferable to employ for this purpose a rack 9 for each frame which may be fixed to the top of the table 1, and a pinion 10 carried by the respective frame and cooperating with the rack, manipulation of the pinion serving to adjust the respective frame in a direction longitudinal of the corresponding rack and toward or from the casing 2. The frames 7 and 8 support lenses 11 and 12 respectively, these lenses having the proper focal length for the particular size of machine for which they are to be used. Means is provided for supporting negatives 13 and 14 in alinement with the respective lenses 11 and 12. Preferably and as shown in the present instance, the negatives are supported by boxes 15 and 16 respectively, which are preferably adjustable in a direction longitudinally of the table or in a direction longitudinally of the optical axes of the respective lenses 11 and 12, the negative boxes being preferably supported slidably on rods 17 and 18 mounted at the ends of the table and extending longitudinally thereof. The boxes 15 and 16 are preferably provided with slideways or pockets 19 and 20 respectively, in which the negatives may be inserted. The negatives are illuminated preferably by condensing lens systems 21 and 22 which are located behind the respective negatives. The condensing lens systems may be of any well known type, but it is preferable to employ condensing systems each of which comprises a pair of reversely arranged plano-convex lenses 23 and 24, between which is placed a ground glass 25, an electric lamp 26, or other source of light, being located behind the condensing lens system. By this arrangement, the rays or light from the electric lamp or other source of light are distributed evenly over the surface of each negative, so that all portions of the negatives will be uniformly illuminated.

The photographic paper or other sensitized material is preferably supplied from a roll 27 of such material which may be mounted on a shaft 28 suitably supported in a compartment or a box 29 mounted on the top of the casing 2, the end of the strip of photographic material unwinding from the roll passing around a roller or guide 30, and thence passing downwardly through registering slots 31 and 32 formed respectively in the bottom of the box 29 and the top of the casing 2, the strip then passing downwardly between a pair of feed rollers 33 and 34. From this point the photographic strip passes downwardly between a pair of image glasses 35 and 36 which are of clear crystal glass and are spaced apart sufficiently to permit free passage of the photographic strip, but are sufficiently close together to accurately support a length of film in the focal plane of the camera. One of the feed rollers, the roller 33 in the present instance, can be operated from the exterior of the machine by the handle 37 which is fixed to its shaft, the rollers 33 and 34 cooperating to feed the photographic paper or strip to the desired length downwardly into exposing position between the image glasses 35 and 36. Below the image glasses is provided a device for cutting off the photographic strip into any desired or proper lengths. In the present instance, a cutter bar 38 is slidable transversely across the path of the photographic strip immediately below the image glasses 35 and 36, the cutter bar being arranged to cooperate with a groove bar 38ª to sever the photographic strip, although the cutter bar 38 may be retracted to permit the photographic strip to be fed downwardly prior to severing. The cutter bar may be operated in any suitable way, it being provided in the present instance with an operating shaft 39 which is rotatable in the lower portion of the casing 2 and has arms 39ª which operatively engage the cutter bar, the shaft 39 projecting to the exterior of the casing 2 and being provided with a suitable handle 40, by means of which it may be operated with facility.

The top of the table 1 is provided with a slot or opening 41, through which the exposed photographic strip may be fed downwardly from the exposing position, and it is preferable to provide means to receive the exposed strip at this point and to develop and fix it. For this purpose, it is preferable to construct the table 1 in hollow form to accommodate the developing and fixing means therein. Developing and fixing means of different kinds may be used, the developing means in the present instance comprising a developing tray 42 mounted on a slide or carrier 43, and this slide or carrier may also support and carry a tray 44 to contain a fixing bath, the carrier being mounted to reciprocate longitudinally within the table, for which purpose it may be provided with a rack 45, and a cooperating pinion 46, the pinion shaft having a suitable handle 47 attached thereto, whereby the developing and fixing baths may be reciprocated appropriately in a direction longitudinally of the chamber 48 which is formed within the table. In using the developing and fixing means described, the carrier 43 will occupy the position shown in Figure 2 at the time the exposed section of the photographic strip is fed downwardly from exposing position, this exposed section of the strip being thereby fed into the opening in the top of the developing tray 42, so as to be exposed to the developing solution contained therein. After the exposed section of the strip has been subjected for a suitable length of time to the action of the developing solution, the carrier 43 is shifted to the right in Figure 2, this having the effect of withdrawing the exposed and developed end of the photographic strip from the developing tray 42 and bringing the fixing tray 44 beneath the strip. The cutter bar 38 is then operated to sever the exposed and developed end of the photographic strip, whereupon the severed section of the strip drops into the fixing bath. This operation is repeated for the developing and fixing of each exposed section of the photographic strip and when a suitable number of prints accumulate in the fixing tray, a door 49 which may be hinged in one side of the table 1 may be opened, after the carrier 43 has been shifted into the position shown in Figure 2, the fixing tray 44 then registering with the opening uncovered by the door, so that this tray can be withdrawn laterally from the carrier 43 and through the door opening to permit removal of the accumulated fixed prints.

The bellows 5 and 6 are preferably provided with means for detachably connecting them to the opposite sides of the casing 2, whereby either of the bellows or both of them may be detached from the casing 2, either or both of the clear glasses 35 and 36 may be replaced by ground glasses, and the operator may then view the image projected on to such ground glass from either or both negatives; and by adjusting the frame 7 or 8, or negative box 15 or 16, or both frame and negative box, at either or both sides of the casing 2, the operator is enabled to obtain properly focused images of any desired sizes from the negatives. After the focusing operation has been completed, the clear glasses 35 and 36 are replaced and the bellows 5 and 6 are re-attached to the respective sides of the casing 2. Thumb screws 50 and 51 are shown in the present instance for detachably securing the bellows to the respective sides of the casing 2.

In using a machine as hereinbefore described in the enlargement of negatives, the negatives are inserted in the slides 19 and 20 of the respective negative boxes and the lamps 26 are made luminous. After the machine has been manipulated to properly focus the images of the negatives according to the size of the enlargement required, and the clear glasses 35 and the bellows 5 and 6 have been replaced, the handle 37 is operated to feed photographic material from the roll 27 until the paper reaches the cutter bars. The section of photographic paper which is sensitized on both sides and is intreposed between the clear glass plates 35 and 36 is then exposed by the operation of any suitable or well known shutters such as those used in conjunction with camera lenses, enlarged images or copies of the small negatives being thus made on the respective sides of the section of photographic material or paper contained between the glass plates 35 and 36. After exposure, the handle 37 is again operated to feed another section of the photographic paper into exposing position between the glass plates 35 and 36, this operation causing the section of the paper already exposed to pass downwardly between the cutter bars 38 and 38ª and into the developing bath in the developing tray 42. This developing receptacle 42, as shown in Figure 2 is preferably of considerably less height and length than the length of the exposed section of film that is drawn into the same so that the said section or print may curl up therein within a small space and still be exposed on its surface to the chemical. The exposed section of the strip is permitted to remain in the developing bath for a suitable period of time, after which the handle 47 is operated to shift the developing and fixing trays 42 and 44 to the right in Figure 2, thus withdrawing the developed portion of the strip from the developing bath and bringing the fixing bath beneath it, at which point the handle 40 is operated to sever the exposed and developed section of the strip from the remainder thereof, the severed section of the strip then dropping into the fixing bath. This fixing tray or receptacle is preferably of a length sufficient to accommodate the print or section in flat condition but both trays together are more compact than usual and the travel of the print from one bath to the other is very much shortened. The operation may be repeated as many times as desired from the same negative or from different negatives, from which the same size enlargement is desired. If, however, it is desired to change the size of enlargement, it will be necessary to refocus the machine accordingly.

If desired, cloth or other coverings may be extended between the frame 7 and negative box 15 and between the frame 8 and the negative box 16, in order to exclude light at these points which may unfavorably affect the reproduction or enlargements, although it is generally preferable to leave the spaces between these frames and the respective negative boxes open, as shown, in order that the operator may visually examine the illumination of the negatives in the boxes, and an ordinary focus cloth may, if desired, be placed over the spaces between the frames 7 and 8 and the respective negative boxes.

Photographic enlarging or reproducing cameras constructed in accordance with the present invention are particularly suitable for use commercially or on a large scale for the making of enlargements of a large number of relatively small negatives. For example, in preparing duplicate records or in recording documents such as deeds and the like, small film negatives may be first made from the originals, after which the enlargements may be made of the proper size to make up the page volumes of the records, the small negatives being easily stored away as permanent records as they require a minimum amount of space, and by making the enlargements on the opposite sides of photographic paper which is sensitized on both sides, books or bound volumes made up from the enlargements will occupy a minimum amount of space as both sides of each leaf can be utilized for the enlargements or reproductions, no blank pages being necessary as is the case with reproductions made on photographic paper of the ordinary kind which is sensitized on one side only.

I claim as my invention:

1. A reproducing or enlarging camera comprising a hollow table having a chamber extending longitudinally therein, a casing mounted on the top of the table and embodying means for feeding and supporting a sheet of photographic material sensitized on both sides, the sheet to occupy a plane transverse to the length of said chamber, negative supports mounted on the table at opposite sides of the casing, lenses located in alinement between the negative supports and the respective sides of the casing, the optical axes of said lenses being arranged longitudinally of said chamber, severing means arranged to operate on the portion of the sheet fed from the casing, and print developing and fixing means reciprocable longitudinally within the chamber in the table and arranged to receive exposed portions of the photographic sheet fed from the casing.

2. In a photographic apparatus adapted to expose first one side and then the other side of a film strip sensitized on both sides, the combination with a camera casing embodying a dark chamber, a roll holder and means for supporting a length of film in the focal plane of the camera, of means carried by said casing for feeding the said double sensitized film through the focal plane support, means also carried by said casing in the dark chamber below the film support for severing exposed lengths of such film, a receptacle for receiving the severed prints arranged below the focal plane film support, the casing and receptacle being relatively movable, and optical means for exposing first one side and then the other side of a section of film which occupies a focal plane in the dark chamber.

In testimony whereof I have hereunto set my hand.

ARTHUR W. CAPS.